US005764746A

United States Patent [19]

Reichelt

[11] Patent Number: 5,764,746
[45] Date of Patent: Jun. 9, 1998

[54] HOLDING PARTY CALL BACK SUBSCRIBER FEATURE

[75] Inventor: Martin Reichelt, Plano, Tex.

[73] Assignee: Ericsson, Inc., Research Triangle Park, N.C.

[21] Appl. No.: 657,973

[22] Filed: May 30, 1996

[51] Int. Cl.⁶ .................................................. H04M 3/48
[52] U.S. Cl. ........................... 379/207; 379/67; 379/162
[58] Field of Search ............................... 379/162, 163, 379/215, 213, 212, 211, 210, 207, 201, 265, 266, 309, 127, 142, 89, 88, 69, 70, 67, 164

[56] References Cited

U.S. PATENT DOCUMENTS

| | | | |
|---|---|---|---|
| 2,506,279 | 5/1950 | Rowe | 379/163 |
| 3,961,142 | 6/1976 | Caffine | 379/162 |
| 4,425,479 | 1/1984 | Dubner et al. | 379/162 |
| 4,834,551 | 5/1989 | Katz | 379/68 |
| 5,003,587 | 3/1991 | Forbes | 379/393 |
| 5,095,504 | 3/1992 | Nishikawa et al. | 379/162 |
| 5,396,542 | 3/1995 | Alger et al. | 379/67 |
| 5,425,091 | 6/1995 | Josephs | 379/201 |
| 5,436,967 | 7/1995 | Hanson | 379/266 |
| 5,479,495 | 12/1995 | Blumhardt | 379/207 |
| 5,557,658 | 9/1996 | Gregorek et al. | 379/67 |
| 5,572,587 | 11/1996 | Gaglani | 379/266 |
| 5,627,884 | 5/1997 | Williams et al. | 379/88 |
| 5,661,790 | 8/1997 | Hsu | 379/209 |
| 5,668,861 | 9/1997 | Watts | 379/201 |

*Primary Examiner*—Krista Zele
*Assistant Examiner*—Scott L. Weaver
*Attorney, Agent, or Firm*—Jenkens & Gilchrist

[57] ABSTRACT

A first subscriber activates a hold call back subscriber feature in response to a second subscriber placing the first subscriber on call hold. After the activation, the first subscriber goes onhook. When the second subscriber later wishes to take the first subscriber off of call hold, a first end office serving the first subscriber recognizes the second subscriber's action and accordingly alerts the first subscriber back. Upon answering the ring back, a call connection is re-established between the first subscriber and the second subscriber. A connection-less signal is communicated between the first end office and a second end office serving the second subscriber to queue, monitor, and inform the second subscriber's action. Upon receiving a connection-less signal from the second office indicating that the second subscriber wishes to take the first subscriber off of call hold, the first end office originates another call setup request towards the second subscriber.

15 Claims, 6 Drawing Sheets

HOLDING PARTY CALL BACK SUBSCRIBER FEATURE

BACKGROUND OF THE INVENTION

1. Technical Field of the Invention

The present invention relates to a telecommunications system and, in particular, to a subscriber feature for establishing a call connection with a held party.

2. Description of Related Art

With the continuing development of telecommunications technology, telecommunications subscribers are able to engage in multiple call connections by placing one or more connected subscribers on call hold. Call hold is a call state invoked by a party to the call via signaling from his or her telephone set that results in the call being disconnected from that party's telephone terminal while remaining connected to the associated end office. As an illustration, a first subscriber with a call waiting subscriber feature can flash to put a second subscriber for an existing call on call hold and to answer an incoming call from a third subscriber. After establishing a new call connection with the third subscriber, by hook-flashing, the first subscriber can similarly place the third subscriber on call hold and re-establish the call connection with the second subscriber. As another illustration, an operator within a Private Branch Exchange (PBX) system can also place multiple incoming calls on hold and later sequentially process the calls on hold.

For most subscribers, a common experience associated with being placed on call hold is that it is unpleasant and frustrating. The held subscriber has no way of determining when the other party is going to re-establish the call connection. Furthermore, a conventional telecommunications system has no means to alert the held subscriber once the call connection has been re-established thus requiring the held subscriber to remain on the telephone handset and wait for the re-connection.

In an attempt to alleviate these problems, a number of arrangements have been proposed to alert the held subscriber when he or she is taken off of call hold. One such arrangement enables the second subscriber to call back the first subscriber who has gone onhook and disconnected the call in response to the second subscriber placing the first subscriber on call hold. Unfortunately, such an arrangement requires the first subscriber to disclose his or her telephone directory number to enable the second subscriber to perform the call back service. Furthermore, because the call back service is being provided by the end office serving the second subscriber, if the first subscriber calls a subscriber who is associated with an end office not equipped to provide the call back service, the first subscriber is not able to utilize the service even if the end office serving the first subscriber has the capability.

Accordingly, there is a need for a mechanism to perform the call back service by the end office serving the held subscriber.

SUMMARY OF THE INVENTION

The present invention provides a method and apparatus for enabling an end office serving a first subscriber to call back the first subscriber who has gone onhook in response to being put on call hold by a second subscriber. A first call connection is established between the first subscriber and the second subscriber. In response to the second subscriber placing the first subscriber on call hold, the first subscriber activates the hold-call-back feature and goes onhook. The second subscriber is monitored to determine if the second subscriber has taken the first subscriber off of call hold. In response to an affirmative determination, the first subscriber is alerted and the speech connection is re-established.

As an embodiment, the first call connection between the first subscriber and the second subscriber remains connected even after the first subscriber has gone onhook. A first end office serving the first subscriber further generates an announcement message informing the second subscriber that the first subscriber has gone onhook and to press a particular Dual Tone Multi-Frequency (DTMF) tone if the second subscriber wishes to call back the first subscriber.

As another embodiment, after the first subscriber activates the hold-call-back feature, the first end office serving the first subscriber transmits a Transaction Capabilities Application Part (TCAP) message instructing the second end office serving the second subscriber to queue a request towards the second subscriber terminal. Whenever the second subscriber takes the first subscriber off of call hold, the second end office transmits another TCAP message informing the first end office of the second subscriber's action. The first end office alerts the first subscriber and also originates a second call setup request towards the second subscriber terminal in response to the receipt of such a signal. A new call connection is then established between the first subscriber and the second subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
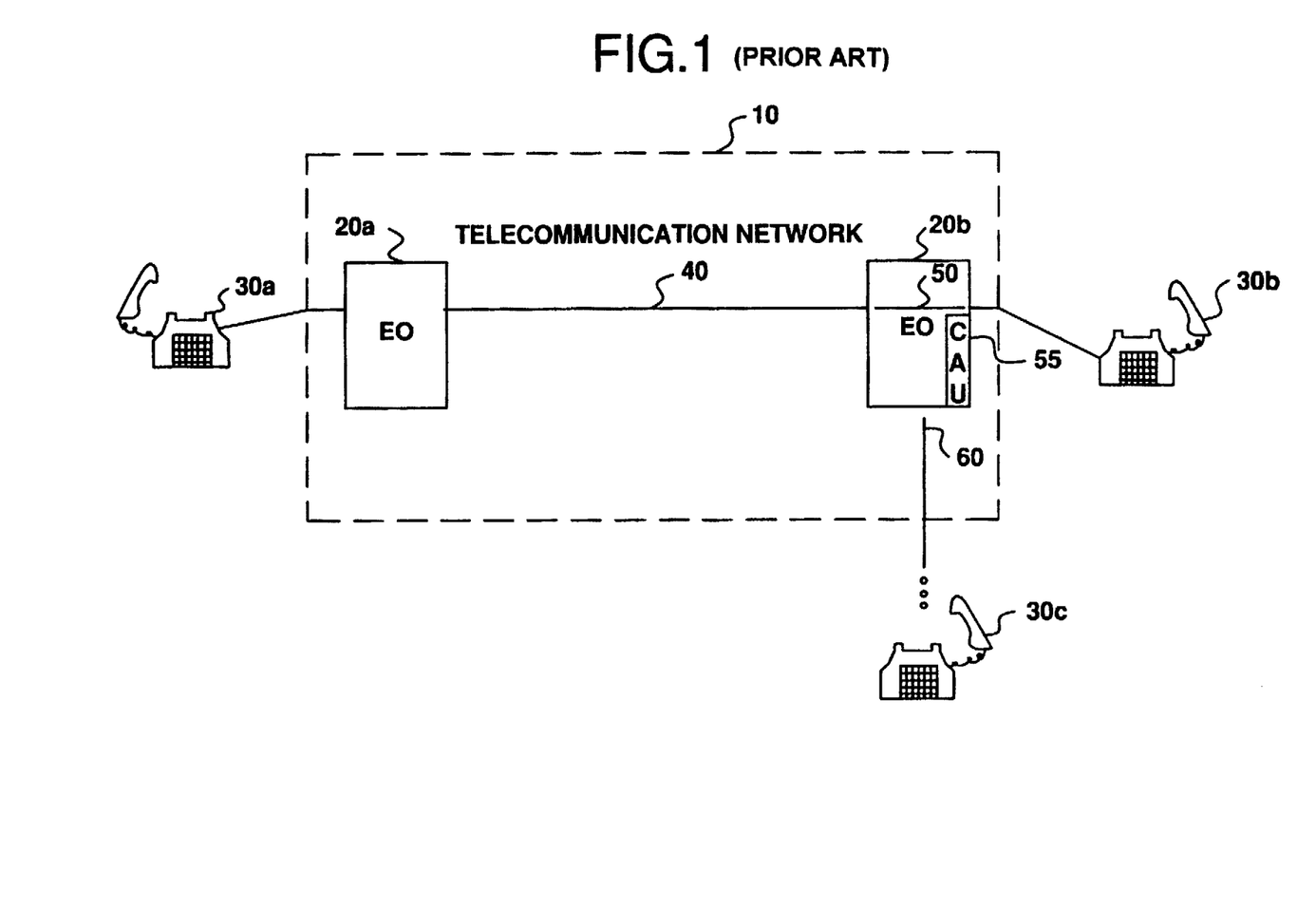
FIG. 1 is a block diagram of a conventional telecommunications network illustrating the call connection of a plurality of subscriber terminals.

FIG. 1 is a block diagram of a conventional telecommunications network 10 illustrating the call connection of a plurality of subscriber terminals. The conventional telecommunications network 10 comprises a plurality of end offices 20 each serving a number of individual telecommunications subscriber terminals 30. Such an end office 20 includes a wireline local exchange, switching service point (SSP) within an Intelligent Network (IN), and a mobile switching center (MSC) serving a mobile station. With the introduction of advanced switching systems, such as a Private Branch Exchange (PBX), and advanced subscriber features, such as Call Waiting and Call Hold, a telecommunications subscriber is now able to place an existing subscriber on hold and accept or make additional call connections with other subscribers. As an illustration, a first subscriber 30a originates a call connection towards a second subscriber 30b by dialing the directory number associated with the second subscriber 30b. A first end office (EO) 20a serving the first subscriber 30a transmits a signal requesting call connection, such as an Initial Address Message (IAM) over a Signaling System No. 7 network, to a second EO 20b serving the second subscriber 30b. A first call connection 40 is accordingly established between the first subscriber 30a and the second subscriber 30b. The second subscriber 30b is then alerted (rung) and, upon answering the call, a speech connection is established as illustrated by the speech connection 50 within the second EO. Furthermore, the second subscriber 30b has a subscription to the call waiting subscriber (CAW) feature. Accordingly, in case a third subscriber 30c dials the second subscriber 30b who is already in speech connection with the first subscriber 30a, the second end office 20b determines the line status of the second subscriber 30b to be busy and invokes the CAW application module 55. The CAW application module 55 accepts the incoming call connection 60, generates a ring tone to the third subscriber 30c, and also provides a call waiting tone (e.g., three beeps) to the second subscriber 30b in speech. In response to the call waiting tone, the second subscriber 30b hook-flashes, puts the first subscriber 30a on call hold by disconnecting the connection 50, and establishes a second call connection, as illustrated by the call connection 65, with the third subscriber 30c.

The first subscriber 30a now has to inconveniently wait for the second subscriber 30b to take him or her off of call hold and to re-establish the call connection 50. Especially, if the second subscriber 30b is an operator for a business or government agency, most subscribers are frustrated by the length and inconvenience of being put on call hold.

Figure 2:
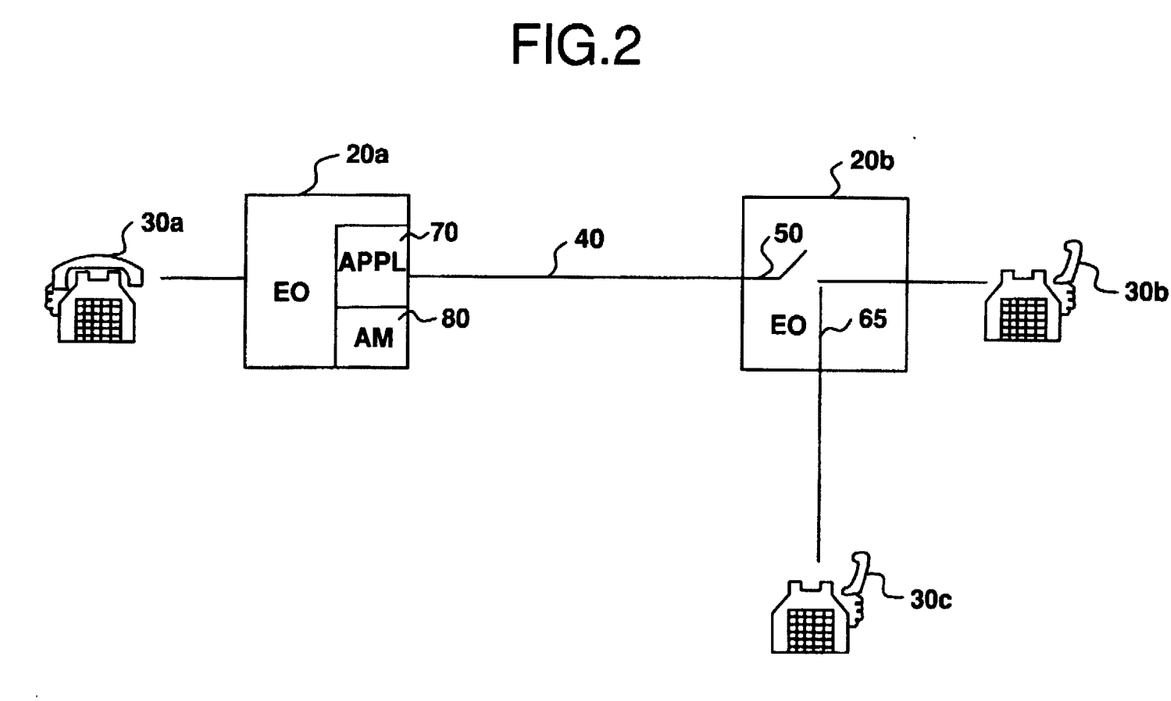
FIG. 2 is a block diagram of a telecommunications network illustrating the call back of a held subscriber by an application module within an end office serving the held subscriber.
Figure 3:
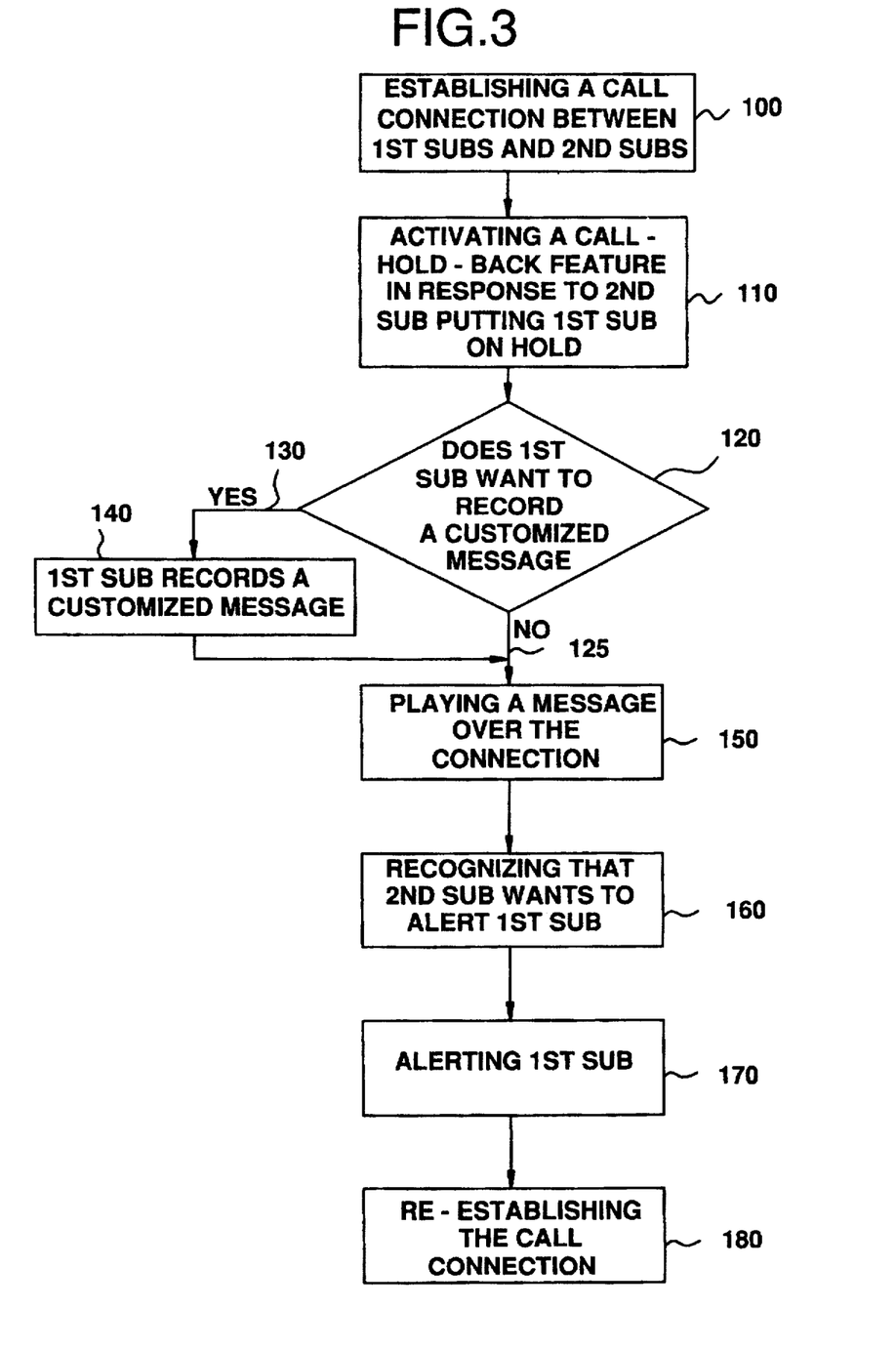
FIG. 3 is a flow chart enumerating the steps performed for calling back a held subscriber by an application module within an end office serving the held subscriber.

Reference is now made both to FIGS. 2 and 3 illustrating the call back of the first subscriber 30a by an application module 70 within the first EO 20a serving the first subscriber 30a. A first call connection 40 is established between the first subscriber 30a and the second subscriber 30b as described above (step 100). In response to the second subscriber 30b placing the first subscriber 30a on call hold, the first subscriber 30a activates the hold call back subscriber feature (step 110). This could be accomplished by the first subscriber hook-flashing, receiving a recall dial tone (RDT), and entering a particular service code to activate the feature. Upon receiving the appropriate digits associated with the hold call back subscriber feature, the first EO 20a accordingly invokes the application module 70. The application module 70 then requests whether the first subscriber 30a wishes to record a customized message to be played to the second subscriber 30b (step 120). In response to an affirmative subscriber indication (decision link 130), the application module 70 connects the first subscriber 30a with an announcement machine 80 and allows the first subscriber 30a to record a customized message (step 140). If the first subscriber 30a wishes not to record a customized message, a pre-stored recording is instead selected (decision link 125). After the successful activation of the hold call back feature, as indicated by the confirmation tone generated by the application module 70, the first subscriber 30a goes onhook. The application module 70 maintains the call connection 40 with the second end office 20b even after the first subscriber has gone onhook. As a result, as far as the second subscriber 30b and the second EO 20b are concerned, the first subscriber 30a is still on call hold.

When the second subscriber 30b hook-flashes, for example, to reconnect to the first subscriber who is supposedly on call hold, the subscriber action is only detected and recognized within the second EO 20b serving the second subscriber 30b. The first EO 20a has no means to determine whether the second subscriber 30a has hook-flashed to reconnect to the call connection 40. In order to inform the second subscriber 30b that the first subscriber 30a has gone onhook and to request a subscriber action that can be detected by the first EO 20a, the application module 70 causes the announcement machine 80 to play a message over the call connection 40 (step 150). An example of such a message may state "your held subscriber has gone onhook, please press 1 any time during the following message to call back the subscriber." A customized message recorded by the first subscriber, if available, can also be played. In case the second subscriber 30b hook-flashes to reconnect to the first subscriber 30a, the second subscriber will instead hear the above message and enter 1 to call back the first subscriber 30a. The application module 70 within the first end office 20a detects the DTMF tone associated with the numerical keypad value of 1 (step 160) and accordingly rings the first subscriber 30a (step 170). The application module 70 may also alert the first subscriber 30a using a distinctive ringing (ringing pattern different from a normal incoming call) for allowing the first subscriber 30a to recognize that this is a call hold back ringing. Upon answering the call, the first subscriber 30a is back in speech connection with the second subscriber 30b (step 180).

During the activation procedure, the first subscriber 3a may also indicate a time limit for the call back procedure. If the second subscriber 30b does not place the first subscriber 30a off of call-hold within the specified time period, the hold-call-back is automatically deactivated by the first EO 20a and the call connection 40 is disconnected. Similarly, the first subscriber 30b may also deactivate the hold-call-back subscriber feature anytime by dialing a preassigned service code. By deactivating the hold-call-back subscriber feature, the first subscriber 30b may go back to the original manual holding status or may disconnect the call connection 40.

Figure 4:
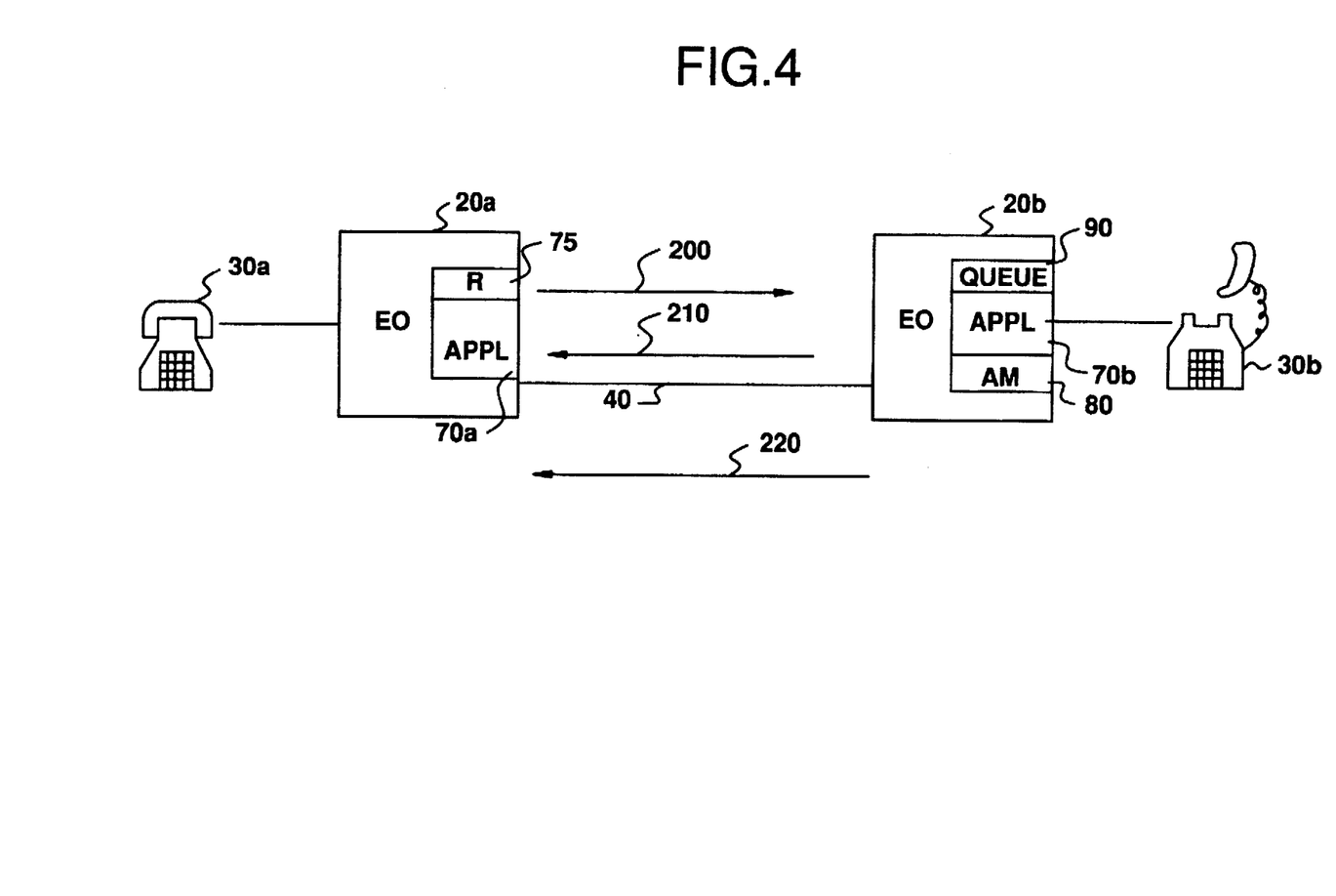
FIG. 4 is a block diagram of a telecommunications network illustrating the communication of a connection-less signal to call back an held subscriber by an application module within an end office serving the held subscriber.

As another embodiment in accordance with the teachings of the present invention, reference is now made to FIG. 4 illustrating the communication of a connection-less signal to call back the first subscriber 30a. In response to the second subscriber 30b placing the first subscriber 30a on call hold, the first subscriber 30a dials a particular service code to activate the hold-call-back subscriber feature. Upon recognizing the appropriate service code associated with the hold-call-back subscriber feature, the application module 70a within the first EO 20a is seized. The application module 70a allocates a memory register (R) 75 for the first subscriber 30a. The application module 70a then assigns a unique identifier (T1) to the allocated memory register and transmits a connection-less signal 200, such as a Transaction Capabilities Application Part (TCAP), to the second EO 20b. The TCAP message 200 instructs the second EO 20b to queue a request to monitor the second subscriber 30b. The TCAP message 200 further includes the assigned T1 value and the directory number associated with the second subscriber 30b as the Called Party Number (CdPn). Upon receiving the transmitted TCAP message, the second EO 20b forwards the received message 200 to a second application module 70b. Upon recognizing the TCAP message 200, the second application module 70b places the request representing the hold call back request on a queue 90. Another unique identifier (T2) for identifying the request within the second EO 20b is also assigned by the application module 70b. Such a queue may comprise a first-in-first-out (FIFO) memory management system for maintaining a number of entries or requests towards a particular subscriber terminal. Upon successful completion of the queuing, the application module 70b connects the first call connection 40 with the announcement machine 80 associated with the second EO 20b.

The first subscriber 30a is again given an opportunity to record a customized message. The application module 70b then transmits an acknowledgment signal back to the first EO 20a via another connection-less signal 210. Such a signal further includes the previously transmitted T1 value and the newly assigned T2 value. The application module 70a then determines that the request to queue has been performed successfully, and the first call connection 40 is disconnected. The application module 70b within the second EO 20b monitors to determine whether the second subscriber 30b has effectuated a subscriber action to reconnect to previously held subscriber. After making such an affirmative determination, the next request from the queue 90 is retrieved by the application module 70b. Using T1, T2 and previously stored Calling Party Number (CgPn), the application module 70b transmits a TCAP message 220 to the first EO 20a informing of the second subscriber's action. The application module 70b also connects the announcement machine 80 with the second subscriber 30b and plays the pre-recorded announcement message.

Upon receiving the transmitted TCAP message 220, the first EO 20a determines the correct register associated with the received T1 value and originates a second call connection using the received T2 value. The call setup signal, such as an Initial Address Message (IAM) over Integrated Service Digital Network User Part (ISUP), with T2 is routed to the second EO 20b. The application module recognizes the IAM signal with T2, and accordingly establishes a new call connection with the second subscriber 30b. By establishing a call connection with the second subscriber who is already off-hook, a normal call connection procedures and conditions, such as checking the line status of the calling party, are not necessary.

As mentioned previously, the first subscriber 30a may also specify a time limit for the call back procedure. A value representing the first subscriber specified time limit is stored within the first EO 20a. If the specified time period expires before the second subscriber 30b places the first subscriber 30a off of call hold, the first EO 20a transmits another TCAP message to the second EO 20b requesting the second EO 20b to de-queue the previously queued request for the first subscriber 30a. All other seized records and resources are also released at both EOs. In a similar manner, if the first subscriber 30a deactives the hold-call-back subscriber feature by, for example, dialing a preassigned service code, the first EO 20a also transmits the same TCAP message requesting the second EO 20b to remove the entry and to release the seized resources.

Figure 5A:
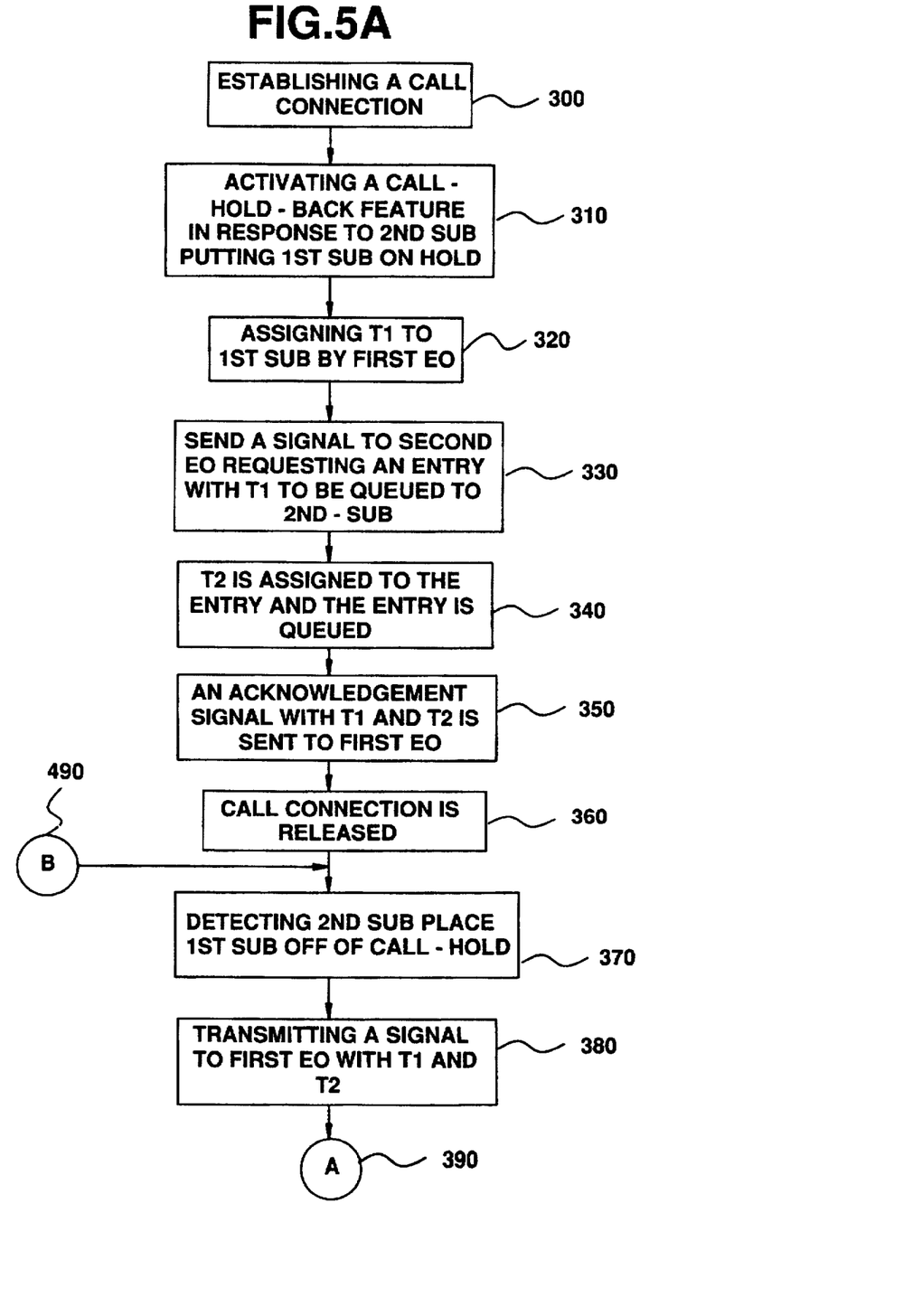
FIGS. 5A and 5B are flowcharts enumerating the steps performed for communicating a connection-less signal to call back a held subscriber by an application module within an end office serving the held subscriber.

Reference is now made to FIG. 5A enumerating the exemplary steps taken to call back the first subscriber by the first EO in accordance with the teachings of the present invention. A first call connection is established between the first subscriber and the second subscriber as described above (step 300). In response to the second subscriber placing the first subscriber on call hold, the first subscriber hook-flashes, receives a recall dial tone (RDT), enters the appropriate service code, and activates the hold call back subscriber feature (step 310). The first subscriber may also activate the feature by pushing a preassigned key attached to the terminal. The hold call back application module within the first EO serving the first subscriber is seized. The application module then assigns a unique identifier (T1) to the activation requests, reserves a memory register, and stores the assigned T1 and the directory number associated with the second subscriber into the memory register (step 320). The application module then transmits a connection-less signal, such as TCAP, to the second EO requesting the second EO to queue a request towards the second subscriber (step 330). The TCAP message is routed using the directory number associated with the second subscriber as the called party number (CdPn) and further includes the assigned T1. Upon receiving the transmitted TCAP message, the second EO also assigns its own unique identifier (T2) to the received request. The request is then put into a queue (step 340). Information associated with the queued request comprises T1, T2, the directory number associated with the first subscriber, and the identification number representing the second subscriber such as a directory number or line connection number. The directory number associated with the first subscriber may be retrieved from the first IAM signal received for establishing the first call connection, or can be included in the TCAP message transmitted by the first EO as the Calling Party Number (CgPn). The first subscriber is then connected to an announcement machine associated with the second EO for recording a customized message to be played to the second subscriber. The second EO then returns an acknowledgment signal back to the first EO indicating the successful queuing of the request (step 350). In response to the acknowledgment signal, the first EO orders the disconnection of the first call connection (step 360). Another application module within the second EO monitors the second subscriber to determine whether the second subscriber has effectuated a subscriber action to take the next held subscriber off of call hold (step 370). As described above, such a subscriber action includes a hook-flash, and pushing a pre-assigned key or a button. The application module within the second EO retrieves the next queued request for the second subscriber and accordingly transmits a TCAP message to the first end office. The transmitted TCAP message further includes assigned T1 and T2 (step 380). In the meantime, the application module within the second EO connects the second subscriber with an announcement machine and plays the pre-recorded message to the second subscriber informing him or her that the other party is being called back. Continuing on to FIG. 5B as indicated by the flow connector 390, the first EO retrieves the memory register associated with the received T1 value, and accordingly determines the line status of the first subscriber. If the first subscriber is idle (decision link 410), the first end office alerts the first subscriber (step 430). Upon answering the ring back by the first subscriber, the first end office originates another call connection towards the second end office (step 440). A call setup request signal, such as an IAM, is transmitted over the network with the directory number associated with the second subscriber as the CdPn. The T2 value is further included in one of the optional parameters, such as a Generic Address Parameter (GAP), within the IAM signal. Upon receiving the IAM signal, the application module within the second EO recognizes the included T2 value, splits the call connection between the second subscriber and the announcement machine, and establishes a second call connection between the first subscriber and the second subscriber (step 450).

Figure 5B:
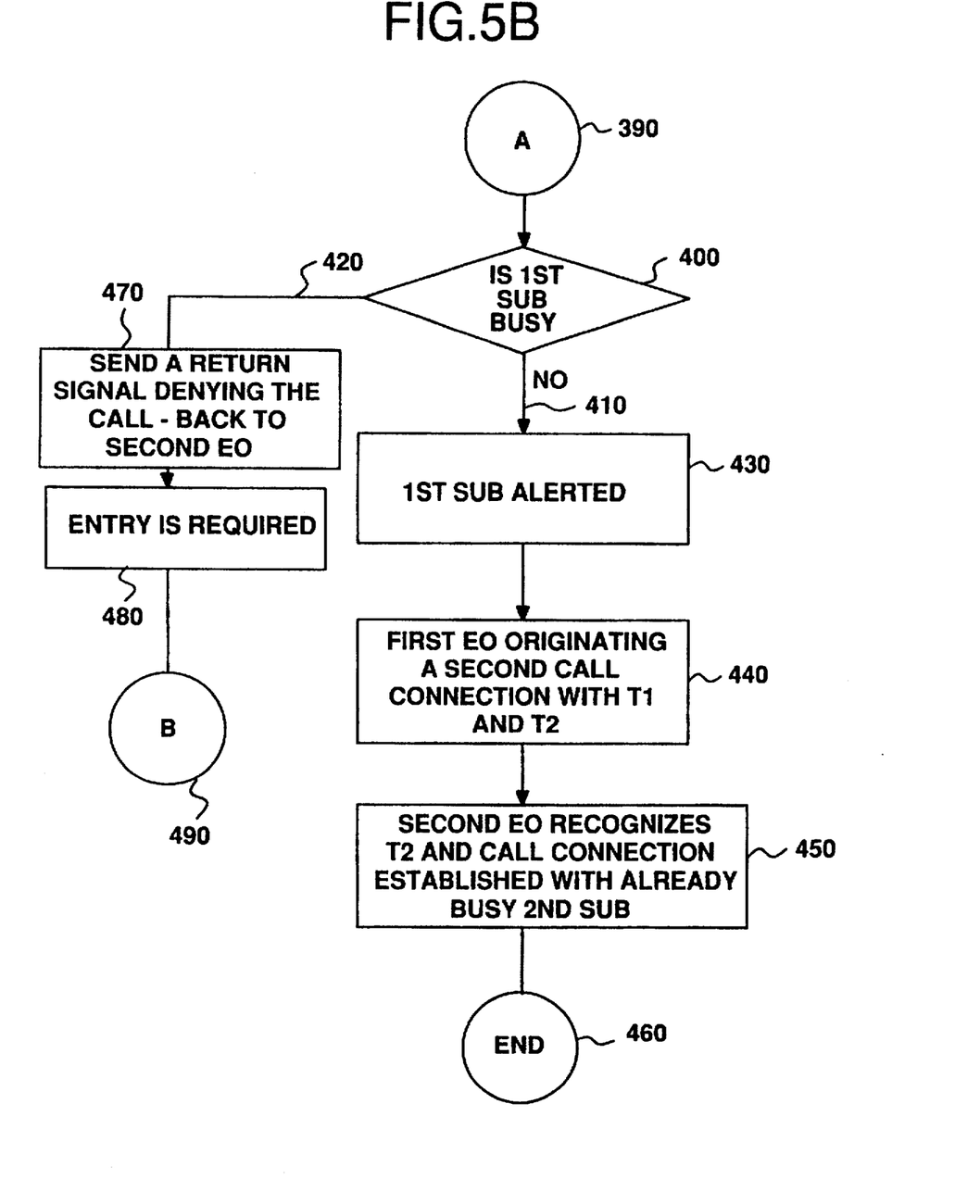

On the other hand, if the first subscriber is already busy (decision link 420), the first EO transmits a return signal denying the call back request to the second EO (step 470). As a result, the application module within the second EO re-queues the request and retrieves the next request from the queue (step 480). The above described procedures from step 370 are then repeatedly performed as indicated by the flowchart connector 490.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for establishing a call connection between a first terminal connected to a first end office and a second terminal connected to a second end office within a telecommunications network, said method comprising the steps of:

establishing a first call connection between said first terminal and said second terminal, said first call connection comprising a certain connection between said first end office and said second end office;

recognizing that said second terminal has put said first terminal on call hold;

recognizing that said first terminal has gone onhook in response to said call hold;

recognizing that said first terminal has been taken off of said call hold;

establishing a second certain connection originating from said first end office to said second end office in response to said step of recognizing that said first terminal has been taken off of said call hold;

alerting said first terminal in response to said recognition of said second terminal taking said first terminal off of said call hold; and connecting said alerted first terminal back to the second certain connection to establish a second call connection between said first terminal and said second terminal.

2. The method of claim 1 further comprising the steps of:

receiving a request to queue an entry towards said second terminal by said second end office in response to said second terminal placing said first terminal on hold;

queuing said request towards said second terminal; and disconnecting said certain connection between said first end office and said second end office.

3. The method of claim 2 further comprising the step of transmitting a signal from said second end office to said first end office in response to said step of recognizing that said first terminal has been taken off of said call hold.

4. The method of claim 3 wherein said signal comprises a connection-less signal.

5. The method of claim 4 wherein said connection-less signal comprises a Transaction Capabilities Application Part (TCAP) signal.

6. A method for establishing a call connection between a first terminal associated with a first end office and a second terminal associated with a second end office within a telecommunications network, said method comprising the steps of:

establishing a first call connection between said first terminal and said second terminal;

receiving a request to queue an entry representing call-on-hold by said second end office in response to said second terminal placing said first terminal on call hold;

disconnecting said first call connection without informing said second terminal in response to a successful queuing of said entry;

recognizing by said second end office that said first terminal has been taken off of said call hold;

transmitting a signal by said second end office to said first end office informing of said recognition; and establishing a second call connection originating from said first end office to said second end office in response to said signal.

7. The method of claim 6 wherein said step of receiving said request further comprises the step of receiving a first connection-less signal from said first end office instructing said second end office to queue said entry.

8. The method of claim 7 wherein said step of transmitting said signal comprises the step of transmitting a second connection-less signal.

9. The method of claim 6 wherein said second end office further comprises an announcement machine and wherein said step of recognizing that said first terminal has been taken off of said call hold further comprises the step of establishing a third call connection between said announcement machine and said second terminal, said announcement machine informing said second terminal that said first terminal is being alerted.

10. The method of claim 9 wherein said step of establishing said second call connection further comprises the step of disconnecting said third connection between said announcement machine and said second terminal and connecting said second terminal to said second call connection originated by said first end office.

11. A system for establishing a call connection between a first terminal associated with a first end office and a second terminal associated with a second end office within a telecommunications network, said system comprising:

means for establishing a first call connection between said first terminal and said second terminal;

means for receiving a request to queue an entry representing call-on-hold by said second end office in response to said second terminal placing said first terminal on call hold;

means for disconnecting said first call connection without informing said second terminal in response to a successful queuing of said entry;

means for recognizing by said second end office that said first terminal has been taken off of said call hold;

means for transmitting a signal by said second end office to said first end office informing of said recognition; and means for establishing a second call connection originating from said first end office to said second end office in response to said signal.

12. The system of claim 11 wherein said means for receiving said request further comprises means for receiving a first connection-less signal from said first end office instructing said second end office to queue said entry.

13. The system of claim 12 wherein said means for transmitting said signal further comprises means for transmitting a second connection-less signal.

14. The system of claim 11 wherein said second end office further comprises an announcement machine and wherein said means for recognizing that said first terminal has been taken off of said call hold further comprises means for establishing a third call connection between said announcement machine and said second terminal, said announcement machine informing said second terminal that said first terminal is being alerted.

15. The system of claim 14 wherein said means of establishing said second call connection further comprises means for disconnecting said third connection between said announcement machine and said second terminal and connecting said second terminal to said second call connection originated by said first end office.

\* \* \* \* \*